(12) United States Patent
Hussain et al.

(10) Patent No.: US 8,408,271 B2
(45) Date of Patent: Apr. 2, 2013

(54) APPARATUS AND METHOD FOR REMOVING PRESSURE ADHESIVE LABELS FROM BACKING AND AFFIXING TO TARGET SUBSTRATE

(75) Inventors: Khalid X. Hussain, Kansas City, MO (US); David C. Faulkner, Saltford Bristol (GB)

(73) Assignee: The United States Postal Service, Washington, DC (US)

( * ) Notice: Subject to any disclaimer, the term of this patent is extended or adjusted under 35 U.S.C. 154(b) by 229 days.

(21) Appl. No.: 11/701,402

(22) Filed: Feb. 2, 2007

(65) Prior Publication Data

US 2008/0185094 A1 Aug. 7, 2008

(51) Int. Cl.
*B23K 37/04* (2006.01)
*B29C 65/56* (2006.01)
*B32B 37/10* (2006.01)
*B32B 37/22* (2006.01)
*B29C 63/02* (2006.01)
*B29C 65/48* (2006.01)

(52) U.S. Cl. ........ 156/758; 156/285; 156/358; 156/580; 156/707; 156/DIG. 31

(58) Field of Classification Search .................. 156/285, 156/358, 580, 707, 758, DIG. 31
See application file for complete search history.

(56) References Cited

U.S. PATENT DOCUMENTS

| | | | | |
|---|---|---|---|---|
| 3,329,550 A | * | 7/1967 | Kucheck | 156/285 |
| 3,508,993 A | * | 4/1970 | Grothjan et al. | 156/215 |
| 4,175,997 A | * | 11/1979 | Muller | 156/362 |
| 4,581,083 A | | 4/1986 | Schutz et al. | |
| 4,601,771 A | * | 7/1986 | Wesley | 156/215 |
| 5,242,526 A | | 9/1993 | Adair | |
| 5,494,544 A | | 2/1996 | Hill et al. | |
| 6,382,693 B1 | | 5/2002 | Ljungmann | |
| 6,542,622 B1 | | 4/2003 | Nelson et al. | |

OTHER PUBLICATIONS

Synonym for "stamp", MSN Encarta—http://encarta.msn.com/encnet/features/dictionary/DictionaryResults.aspx?lextype=2&search=stamp.*
International Search Report and Written Opinion, dated Apr. 30, 2008, issued in Int'l App. No. PCT/US07/06368 (9 pgs).

* cited by examiner

*Primary Examiner* — Sonya Mazumdar
(74) *Attorney, Agent, or Firm* — Lewis and Roca LLP

(57) ABSTRACT

A system, apparatus, and method for removing pressure adhesive indicia, such as labels or stamps, from their backing and affixing the same to a target substrate is provided. The automated process affixes stamps, for example, to the target substrate with both speed and precision of placement. Desired stamps can be selectively removed from a backing, for example, can be placed on variable locations upon the target substrate, and can be affixed in the desired orientation with precise spacing between stamps. The precision of affixation afforded by this system is commensurate with philatelic standards and is suitable for all pressure adhesive indicia where rapid and precise placement is desired for aesthetic or other reasons.

19 Claims, 16 Drawing Sheets

SUBSTRATE FEEDER 100

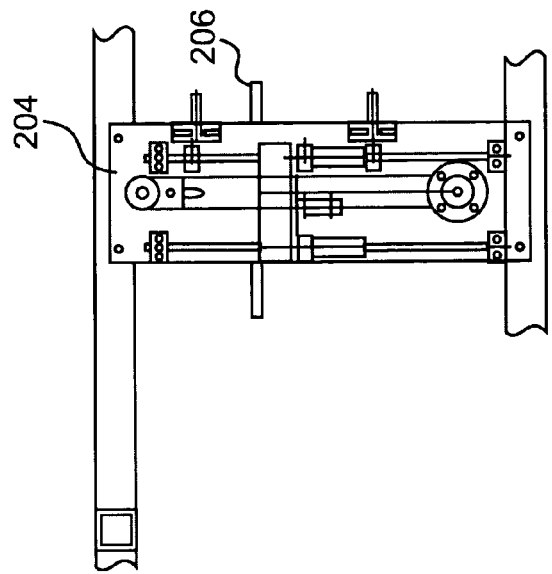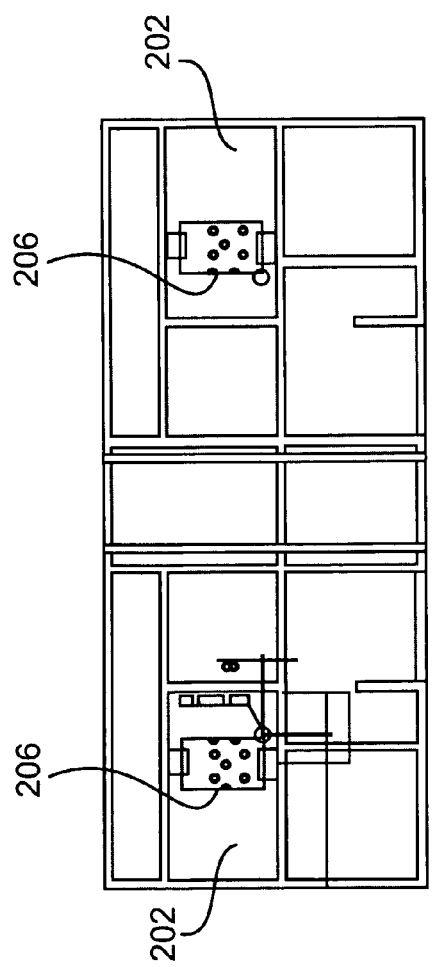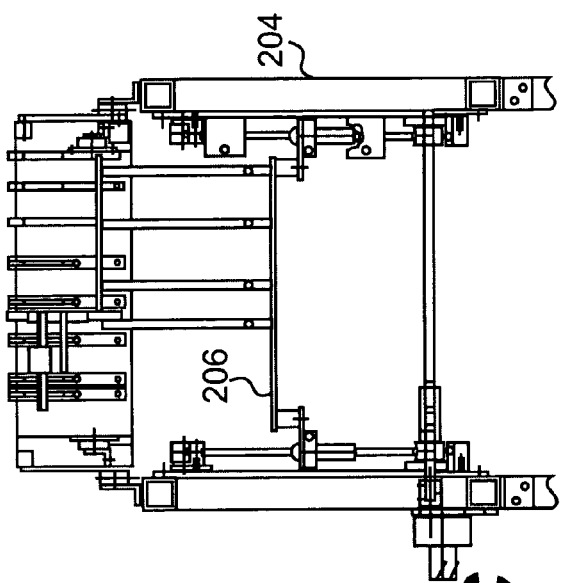

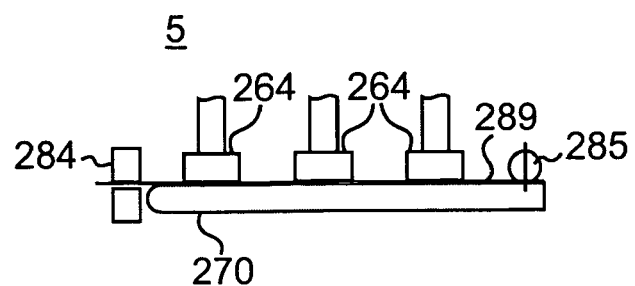
FIG. 15A
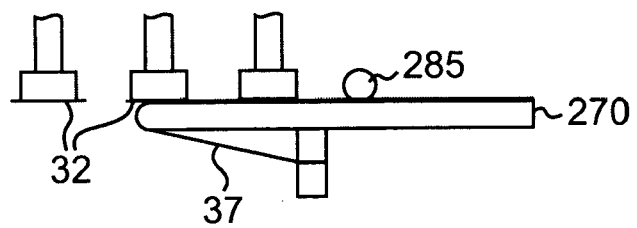
FIG. 15B
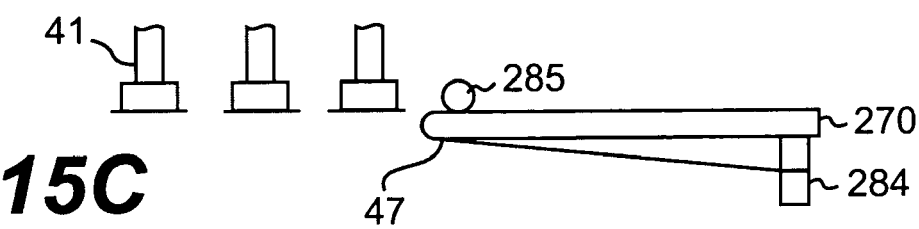
FIG. 15C
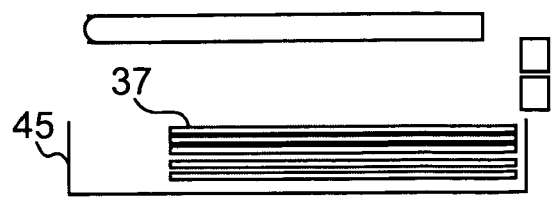
FIG. 15D

APPARATUS AND METHOD FOR REMOVING PRESSURE ADHESIVE LABELS FROM BACKING AND AFFIXING TO TARGET SUBSTRATE

TECHNICAL FIELD

The present invention relates generally to system, apparatus, and method for removing pressure adhesive indicia from their backing and affixing the same to a target substrate.

BACKGROUND

Currently, there is a need to remove fee indicia, such as stamps, from a sheet, or pane, by hand and affix the same to a target substrate, such as an envelope, by hand. Both the speed of this operation and the accuracy of the stamp affixation placement is limited by human capacity. In some circumstances, the need for precision placement contributes dramatically to the labor time required to affix the stamps to the target substrate.

For example, precise placement of the stamp on the target substrate is desired on philatelic items. Philately, that is stamp collecting, is an extremely popular hobby, recognized by many as the most popular hobby in the world. National postal administrations, as well as private sector companies, create items bearing significant postmarks specifically to appeal to those who participate in stamp collecting. In order to be regarded as collectible quality, the stamps must be affixed precisely in a specific placement on the target substrate.

To meet philatelic standards, stamps are, on the average, manually removed and affixed to the target substrate with precision placement at a rate of 150 stamps per man-hour. In fact, the precision placement contributes significantly to the time requirements. Stamps must by placed in a consistent location on the target substrate, in a specific orientation and, when more than one stamp is to be affixed, they must be grouped in a specific configuration and spaced precisely from one another. The placement surface of the target substrate necessarily varies as well, such as a small envelope, a large document envelope, or a package. This variability contributes to the demands of manual-stamp placement.

In addition to the arena of stamp collecting, other applications exist in which removal of pressure adhesive indicia, delivery labels for example, from sheets or sheets and subsequent precise placement is desirable. An increase in production rate of this process would benefit any high volume delivery service. Precise placement can contribute to the ease and speed of future target substrate processing, such as cancelling of delivery fee indicia and verifying delivery fee amount. Precise placement of labels has aesthetic appeal and can contribute to product marketability and sales.

The application for automated removal, affixation, and canceling of self-adhesive indicia is broader than delivery of goods. Other examples include cigarette packages which are labeled, and then the affixed label is cancelled for tax purposes. Presently, this labeling and cancelling stamp by tax stamp is performed by hand. The invention provided herein could readily be utilized by for such practices improving speed and efficiency of the process.

Accordingly, a need exists to reduce the labor requirements while increasing the speed and accuracy of removing pressure adhesive indicia, such as labels, from backing sheets and precisely affixing the same to a target substrate.

SUMMARY

Any reference to self-adhesive indicia, pressure adhesive indicia, labels, and stamps is merely exemplary, any of which could be used in place of another. Consistent with one aspect of the invention, apparatus is provided for precise automated stamp placement upon a target substrate. Consistent with another aspect of the invention is an apparatus for the automated removal of stamps or labels from a backing material. The backing and stamps can be, for example, in an individual sheet, or the sheets can be folded into a booklet configuration.

Consistent with another aspect of the invention, a computer-readable medium storing program instructions is provided which, when executed, enables the user to select a desired stamp or multiple stamps from a given sheet for placement on a target substrate. The user can select the target substrate, the dimensions thereof, and the desired placement location and configuration for the desired stamps. Alternatively, the executed program will select the location and configuration of stamp placement based on at least one of the selected stamps and the selected target substrate. The user can select a sheet of stamps from a collection of the same and further select the desired stamps contained therein. Alternatively to selecting a target substrate from a group, the user can define the dimensions of the target substrate. Also, the user can select printing of a postmark onto a stamp-affixed-target substrate.

Consistent with another aspect of the invention, a method is provided for removing pressure adhesive indicia from their backing sheet and affixing the removed labels to a target substrate. Consistent with another aspect of the invention there is provided a method for returning removed adhesive indicia, e.g. stamps, which are not affixed to a substrate, to a second backing for future use and or accounting purposes. A second backing is of course, not essential, and placement of adhesive indicia upon any paper which is fed out to an accounting and salvage station is commensurate with aspects of the invention.

Consistent with another aspect of the invention there is provided a system for removing pressure adhesive stamps from their backing sheet and affixing the same to a target substrate. The automated system affixes stamps to the target substrate with both speed and precision of placement. Desired stamps can be removed from a backing, can be placed on variable locations upon the target substrate, and can be affixed in the desired orientation with precise spacing between stamps. The precision of affixation afforded by this system is commensurate with philatelic standards and is suitable for all pressure adhesive labels where rapid and precise placement is desired for cosmetic or other reasons.

The system enables loading of target substrates at large into a hopper, feeder, or large collecting container. Target substrates are automatically, guided and moved throughout the system being positioned with accuracy in an affixing station and being subsequently transported to an outfeed area upon processing completion, where processing may include printing of a postmark upon affixed stamps. A magazine, hopper, or other storage apparatus is loaded with sheets of stamps for subsequent feeding to the removal apparatus.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention.

FIG. 4 shows a pair of sheet units.

FIG. 15 is an illustration showing a method of pressure adhesive stamp removal, consistent with an exemplary embodiment of the present invention.

DESCRIPTION OF EXEMPLARY EMBODIMENTS

Figure 1:
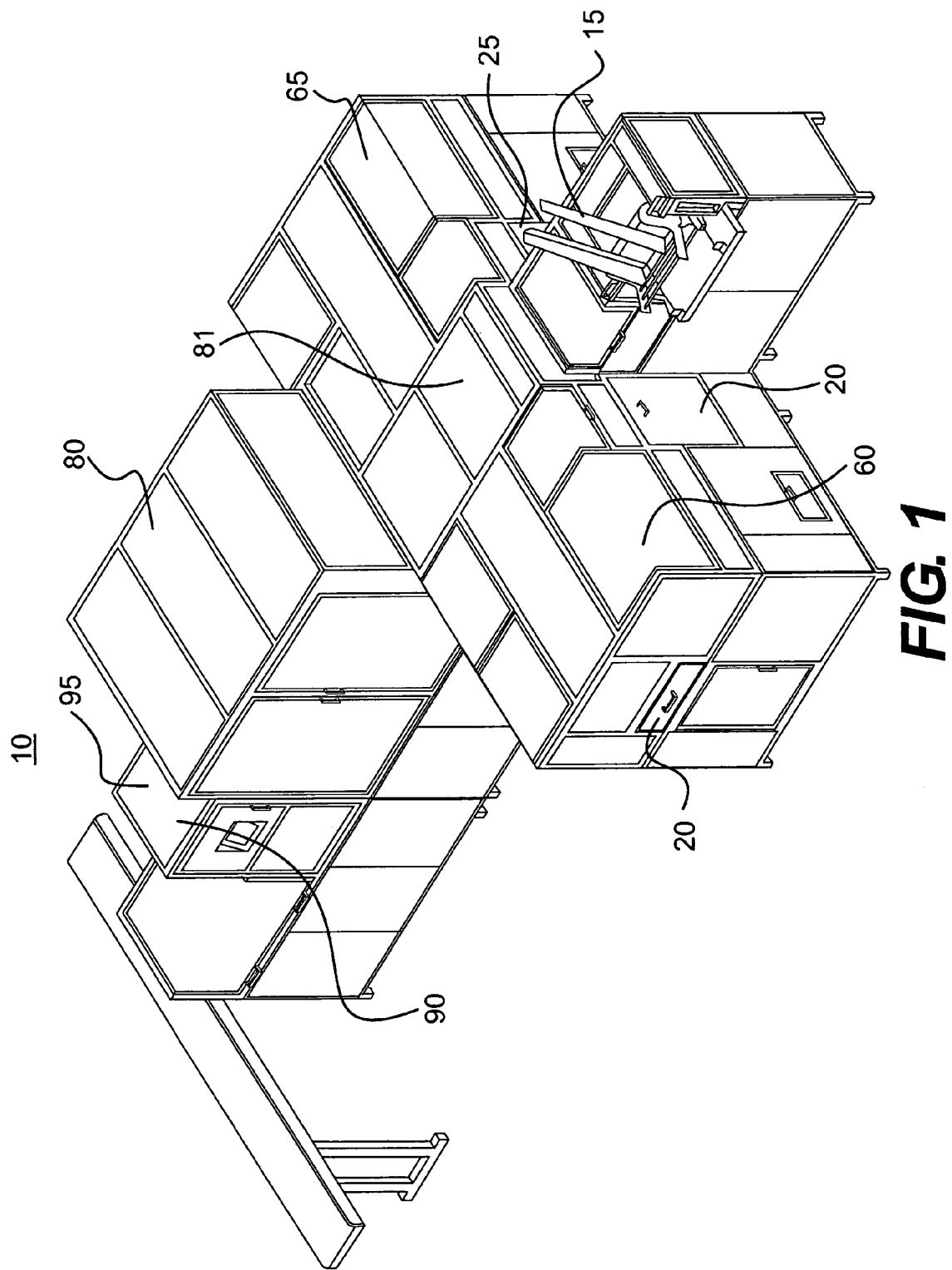
FIG. 1 is perspective view of a system for removing pressure adhesive labels from a backing and affixing labels to a target substrate, consistent with the present invention.

FIG. 1 is perspective view of an automated system 10 for removing pressure adhesive labels from a backing and affixing labels to a target substrate, consistent with the present invention. FIG. 1 shows the major areas and units of system 10 and their physical positions relative to each other in one embodiment.

Figure 2:
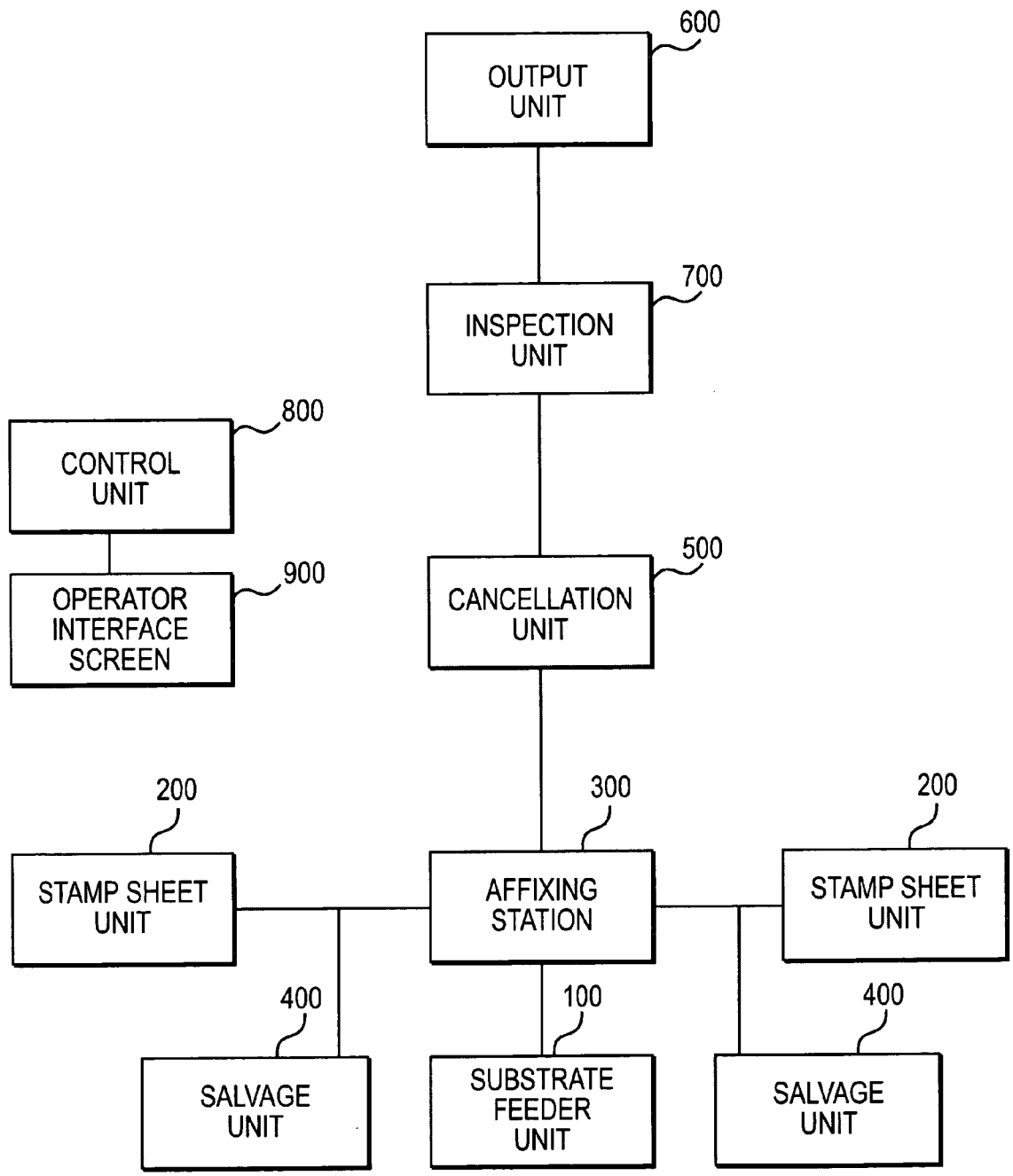
FIG. 2 is block diagram of a system consistent with the present invention.

Consistent with the invention, FIG. 2 is block diagram of an automated system 10 for removing labels, such as stamps, from a backing and affixing them to a target substrate, such as an envelope. System 10 may include a target substrate feeder unit 100, which may be a hopper or large collector apparatus. System 10 may also include a pair of sheet units, or stamp sheet units, 200 and an affixing station 300. System 10 may further include a pair of salvage units 400, a cancellation unit 500, an output unit 600, and an inspection unit 700. A control unit may be provided and coupled to substrate feeder unit 100, sheet units 200, stamp affixing unit 300, salvage units 400, cancellation unit 500, output unit 600, and inspection unit 700 by connections, not shown.

In general operation of one embodiment consistent with the invention, a sheet unit 200 picks up a sheet of stamps and removes the backing from the sheet, while holding the individual stamps. The stamps are then transported to affixing station 300, where the stamps, either individually or in groups, are affixed to envelopes supplied from substrate feeder unit 100 by a transport system. The envelopes with affixed stamps may then be transported to cancellation unit 500 where an imprint, such as a cancellation, is place on the envelopes. After passing through inspection unit 700, the envelopes, with affixed stamps, are transported to output unit 600, which processes the envelopes into a form suitable for packaging. One sheet unit 200 may operate as described above, while the other sheet unit 200 is off-line, being configured to handle a different size sheet, as will be described below in greater detail. In alternate embodiments, system 10 may include only a single sheet unit 200 and salvage unit 400.

Figure 3A:
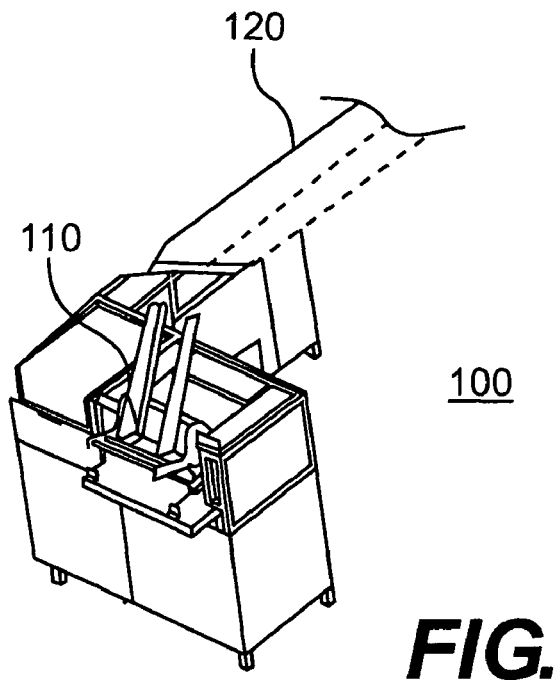
FIG. 3 shows a substrate feeder consistent with the present invention.
Figure 3B:
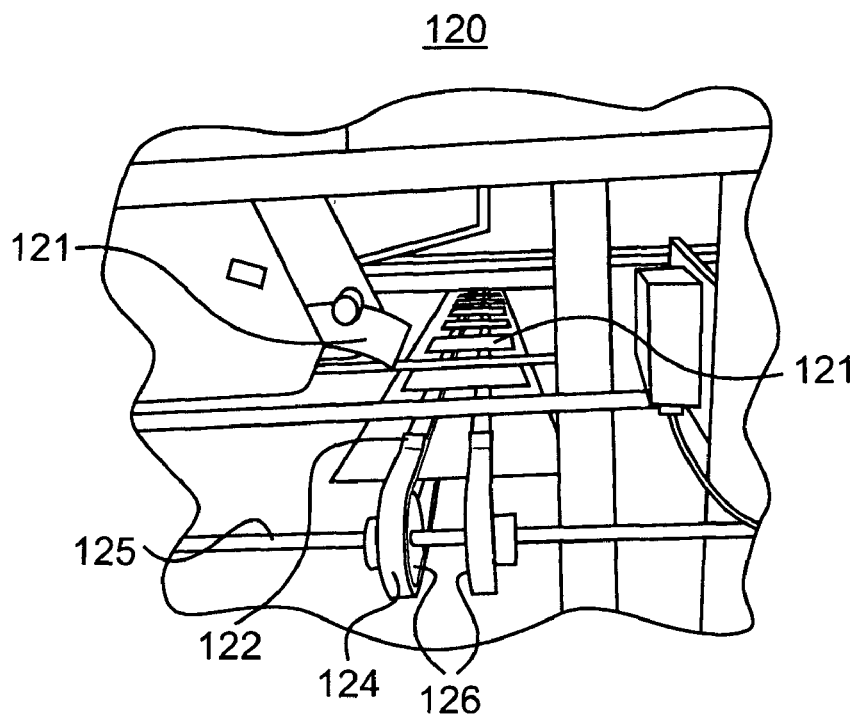

FIGS. 3-13 provide a more detailed view of respective major components shown in FIGS. 1 and 2. FIG. 3 is an illustration of a substrate feeder 100 which includes a substrate hopper 110 and a first transport mechanism 120. In one embodiment, the first transport mechanism maybe an indexing belt. In other embodiments, the substrate feeder comprises a large collector apparatus, and in yet another substrate hopper 110 is a friction feeder. In various embodiments, the target substrate maybe an envelope, a card, or a package. Still further, the package could be a package of consumable goods. The substrate feeder supplies a single substrate to affixing station 300 at an affixing location. Substrates are fed onto transport mechanism 120 singly and then move up the transport line to the point where affixing occurs.

One or more indexing belts, as shown for example in FIG. 3, move the target substrate through system 10 (FIG. 1). These belts may travel just below the surface upon which the substrate rides. The separation of the belts may be adjustable by use of various size magnetic spacer plates (not shown) Pusher members, or "flights," mounted in the belt push the substrate along. In affixation station 300, a front pin, not shown, restricts forward movement of the substrate when positioning the same for affixing the stamps. The indexing belts maybe driven by timing pulleys, with the drive pulleys at the output unit 600 end of the machine and idler pulleys at the substrate feeder unit 100 end. Both drive and idler pulleys maybe attached to timing hubs which are mounted on keyed shafts. The pulleys maybe adjustable along their respective shafts to accommodate different widths of target substrates and different belt separations. Generally, it is sufficient to move the belt closest to the feeder only.

Guide rails (not shown) run along the whole length of the system and maybe magnetically attached to the top plates. The position of the rails should be adjusted to accommodate different target substrate sizes. The rails maybe made in short lengths, such that excessive magnetic force does not oppose desired movement or repositioning. The rails maybe mounted end to end, forming a smooth connection from one rail piece to the next.

Sheet units 200 may comprise a drawer frame 202 and a lifter 204, as shown in FIGS. 4a and b, respectively. FIG. 4a is a top view of a three dimensional frame while FIG. 4b is a side cross-section view. The hopper drawers 20 and 25 (FIG. 1) may slide into the front and back drawer frames 202 (FIG. 4a). Sheets of stamps maybe inserted into a drawer 20 or 25 by an operator as a stack on a lift plate 206 (FIG. 4a). FIG. 4c shows lifter 204 from a front cross sectional view.

Drawer 20 or 25 (FIG. 1) has a secondary container (not shown) inside, which is mounted on slides that allow it to be moved backwards and forward within the drawer. Within the secondary container are a number of vertical retainers (not shown) which allows various size lift plates 206 (FIG. 4a) to be fitted, to accommodate various sizes of sheets.

Lifter 204 operates from beneath the lift plate 206 and raises lift plate 206 supporting the stack of sheets to a position where a pickup unit (described below) can remove a single sheet from the stack. Drawer 20, 25, is locked in the closed position by a pneumatic plunger and maybe released and allowed to open via a push button (not shown). This push button maybe on a safety circuit to prevent release of the drawer during certain periods of the system operation cycle.

Figure 5A:
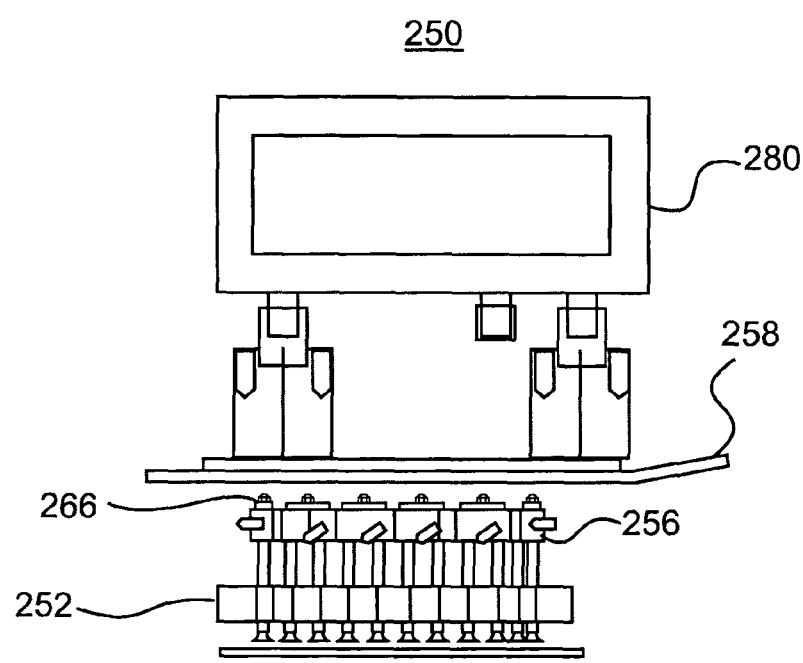
FIGS. 5a to 5c illustrate the various components of a pickup unit consistent with the present invention.

FIG. 5a shows a cross section of a pickup unit 250 consistent with the present invention. Although the embodiment of system 10 shown in FIGS. 1 and 2 operates with a pair of pickup units at either side of feeder unit 200, FIG. 5a shows a single pickup unit 250. The purpose of pickup unit 250 is to pick up and transfer a sheet of stamps from lift plate 206 to a peel unit (peel areas 60, 65, FIG. 2), to the affixing station 300 (FIG. 1), and then return to the salvage unit 400 (FIG. 1) where it deposits any unused stamps and the sheet margins.

Figure 5B:
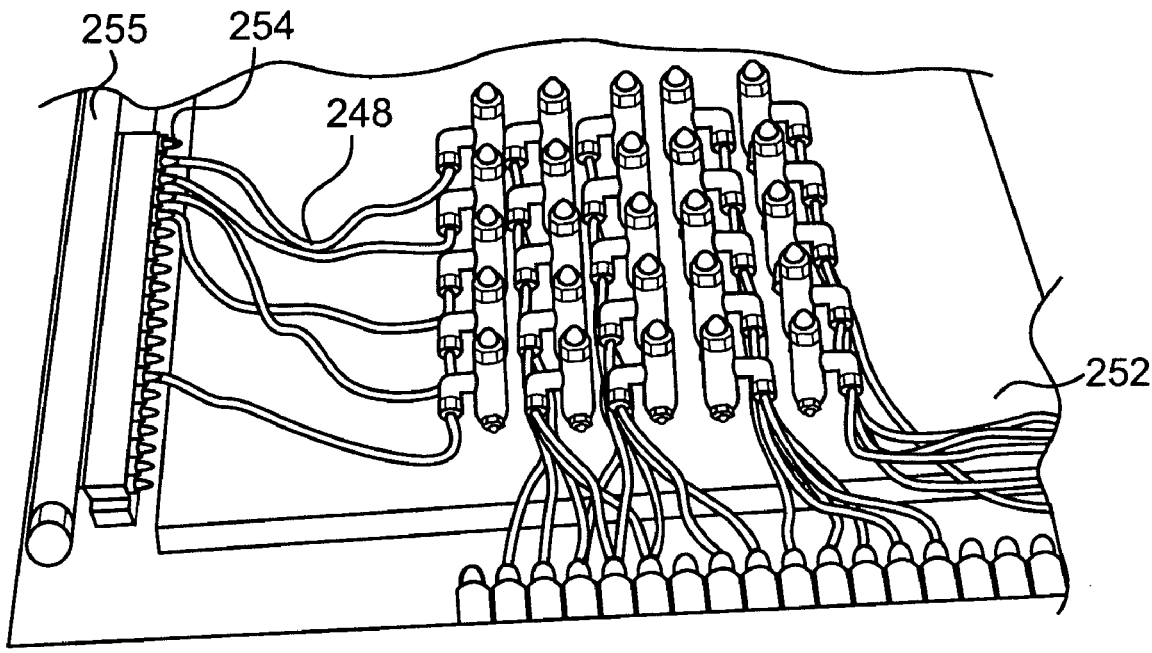

Referring to FIG. 5a, pickup unit 250 may include a suction plate 252 and a plurality of suction units 256 mounted thereon. Turning to FIG. 5b, a top view of the suction plate 252 shows suction units 256 mounted thereon as well as a plurality of miniature electrically-operated vacuum valves 254 and a plurality of connection hoses 258 which connect valves 254 to suction units 256. Pickup unit 250 may also include a pickup plate 258, and a transport system 260 (shown in FIG. 5a). Valves 254 (FIG. 5b) may be arranged in three banks, each parallel to one side of suction plate 252, where FIG. 5b shows two valve banks with hoses 258 extending towards these two banks and towards a third side of the suction plate 252. Suction units 256 may be arranged in an array of, for example, sixty suction units formed as five columns of twelve units. Connection hoses may be removably attached to respective valves 254 and suction units 256 to provide different configurations, as desired for various operational runs of system 10 to process various types of sheets.

Figure 5C:
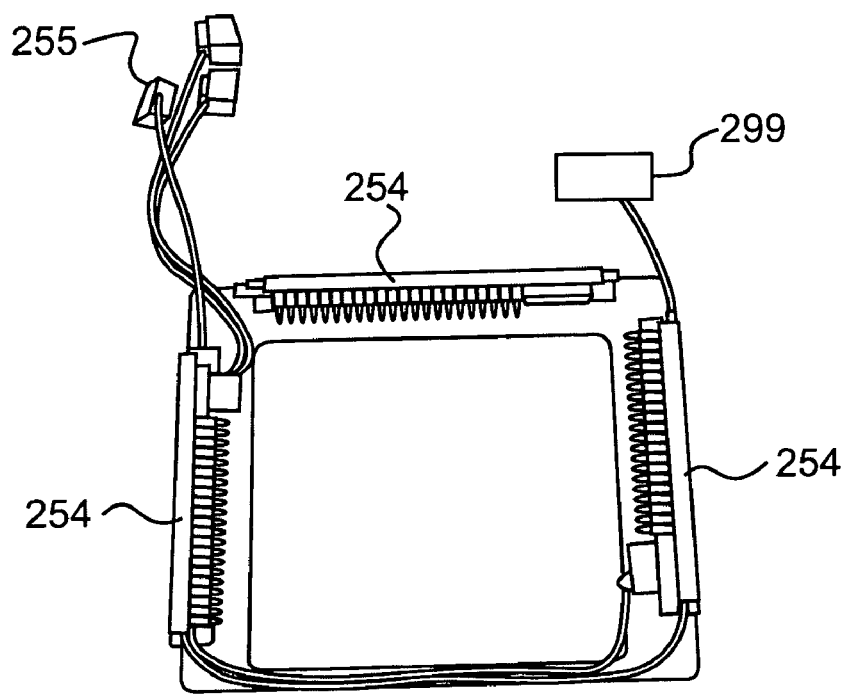

Turning to FIG. 5c, each bank of valves 254 may be connected to a vacuum manifold 255, which may in turn include a component for removable attachment to a vacuum source. Similarly, each valve 254 may be electrically connected to a connection fitting and removably connected to terminals of control system 800 (FIG. 2). The entire suction plate 252, with included valves 254 and suction units 256 may thus be quickly and conveniently removed from pickup unit 250 and replaced with another suction plate 252 having a different configuration of valves 254 and suction units 256.

Figure 7A:
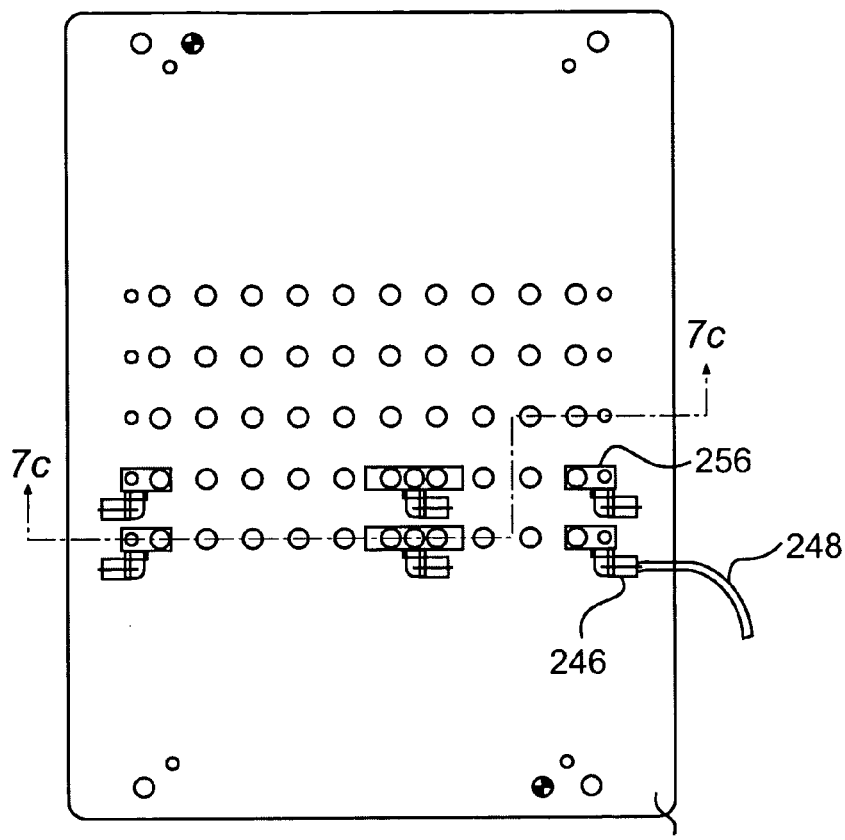
FIG. 7 shows a suction unit consistent with the present invention.
Figure 7B:
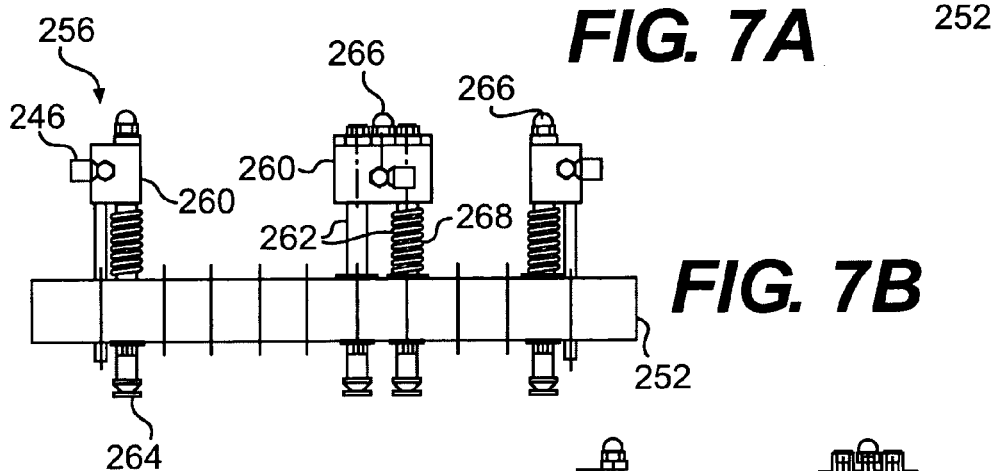
Figure 7C:
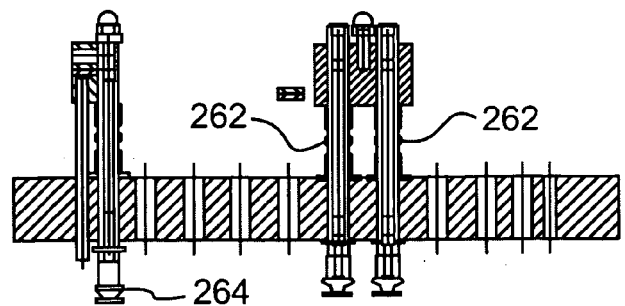

As may be seen more clearly in FIG. 7, suction units 256 may be formed of a suction block 260 including a vacuum port for receiving a connection hose 258, one or more suction tubes 262, and a suction cup 264, formed as a unit. A pneumatic passage is formed from the vacuum port of suction block 260, through suction tubes 262, to suction cup 264. Suction cups 264 are preferably bellows-type suction cups.

Each suction unit 256 may also include a contact nub 266 and a spring 268, to provide a spring-loaded mounting of suction unit 256 to suction plate 252. That is, suction tubes 262 movably extend through suction plate 252, with suction cup 264 and suction block 260 on opposite sides of suction plate 252. Spring 268 maintains suction cup 264 in proximity to suction plate 252. However, downward pressure against nub 266 will cause suction cup 266 to move to a second position spaced away from suction plate 252. Contact nub 266 may be a nylon domed nut.

Figure 6:
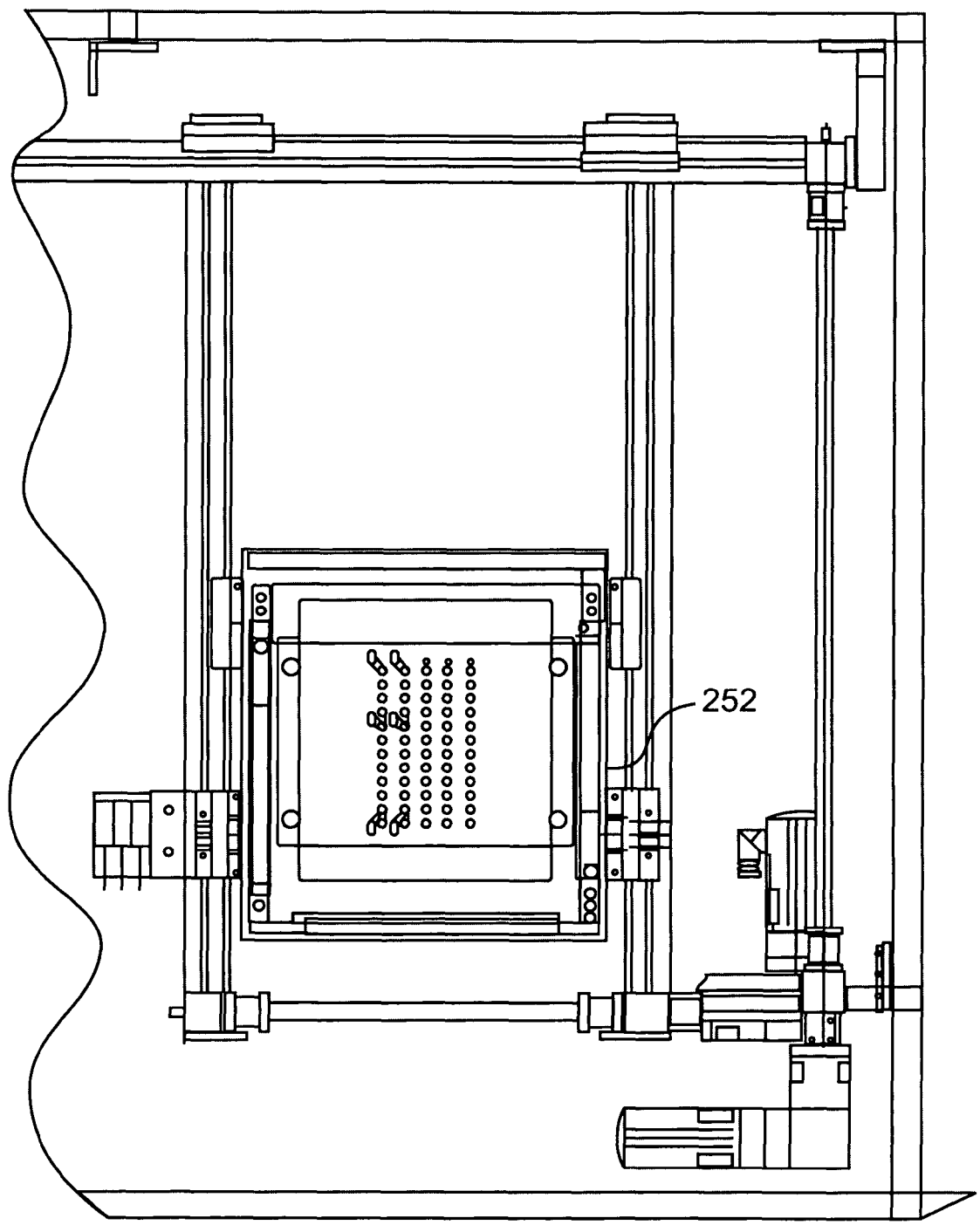
FIG. 6 shows a suction plate, consistent with the present invention.

Referring now to FIG. 6, pickup unit 250 includes an X-Y transport mechanism 280, which enables the suction plate 252 to move with precision in a horizontal plane from a position over the stack of sheets on lifter 204 (FIG. 4a) and to a position in affixing station 300 over the target substrate. Stamps separated from their backing are moved into position via the X-Y transport system of the pickup unit, shown in FIG. 6, to the affixing station 300 (FIG. 1).

Under control of control unit 800, transport mechanism 280 positions pickup unit 250 over the stack of sheets in lifter 204. A pickup plate 258, above and parallel to suction plate 252 is then lowered by control unit 800 into contact with nubs 266 of suction units 256. Pickup plate 258 continues to descend, compressing springs 268 of suction units 256 until suction cups 264 come into contact with the top sheet on lifter 204. Control unit 800 then actuates vacuum valves 254 to deliver suction to suction units 256, causing the top sheet to be held by vacuum against suction cups 264. Control unit 800 then raises pickup plate 258, allowing springs 268 to raise suction cups 264 into proximity with suction plate 252, raising the sheet of stamps.

Figure 8A:
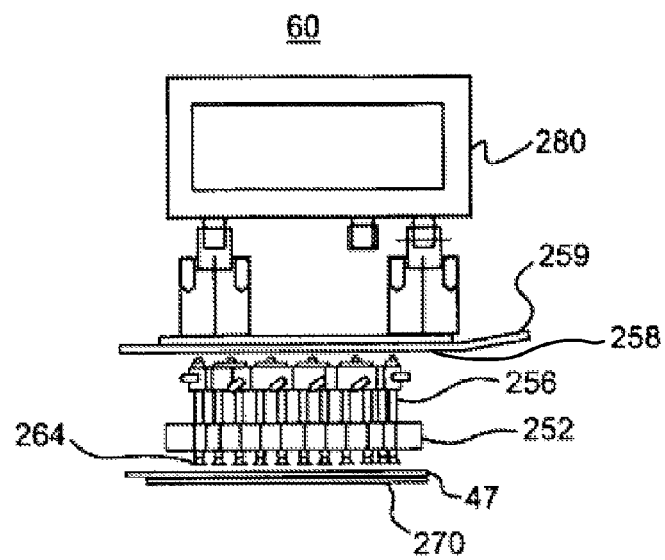
FIG. 8 illustrates components in a peeling area, consistent with the present invention.
Figure 8B:
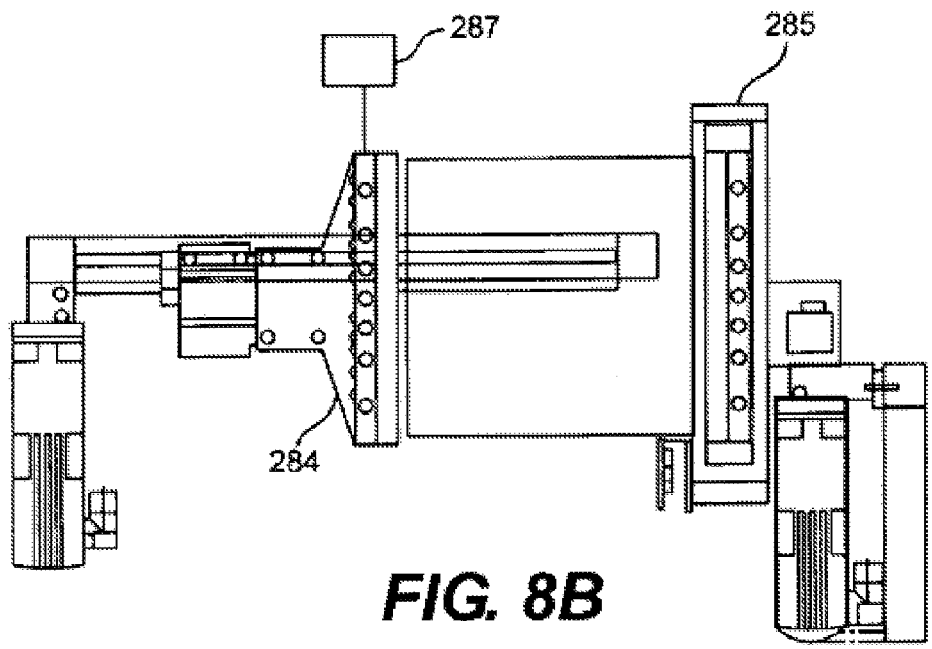

After being removed from the lifter and before being transported to the affixing station, the sheet of stamps is "peeled," separating the stamps from the sheet backing. Turning to FIG. 8, the peeling area may include grippers 284, 285, a pickup plate 258, and peel plate 270. To initiate separating a backing sheet from stamps, a pickup unit 250 is controlled by control unit 800 (FIG. 2) to move a sheet of stamps to the peeling area 60, 65 (FIG. 1) onto a peel plate 270 (FIG. 8). While the suction cups 264 maintain control of the stamps, one or more grippers, for example, grippers 284, 285 of pickup unit 250 clamp onto the selvage, or border area, of the sheet where no stamps are present. Grippers 284, 285 clamp onto opposite sides of the sheet. Briefly, gripper 284 pulls the backing sheet in a downward direction along an edge of peel plate 270, removing the backing from the stamps, which are still held by vacuum to the suction cups. Exemplary peeling operations will be described in greater detail below.

The suction plate X-Y mechanism 280 (FIG. 6), moves the stamps under accurate control of control unit 800 in the X-Y direction in a horizontal plane, to a precise location directly over a substrate on the belt of transport mechanism 120. Transport mechanism 120 has indexing capability, that is, it is capable of transporting and stopping the substrate, also in a precise location.

Figure 9A:
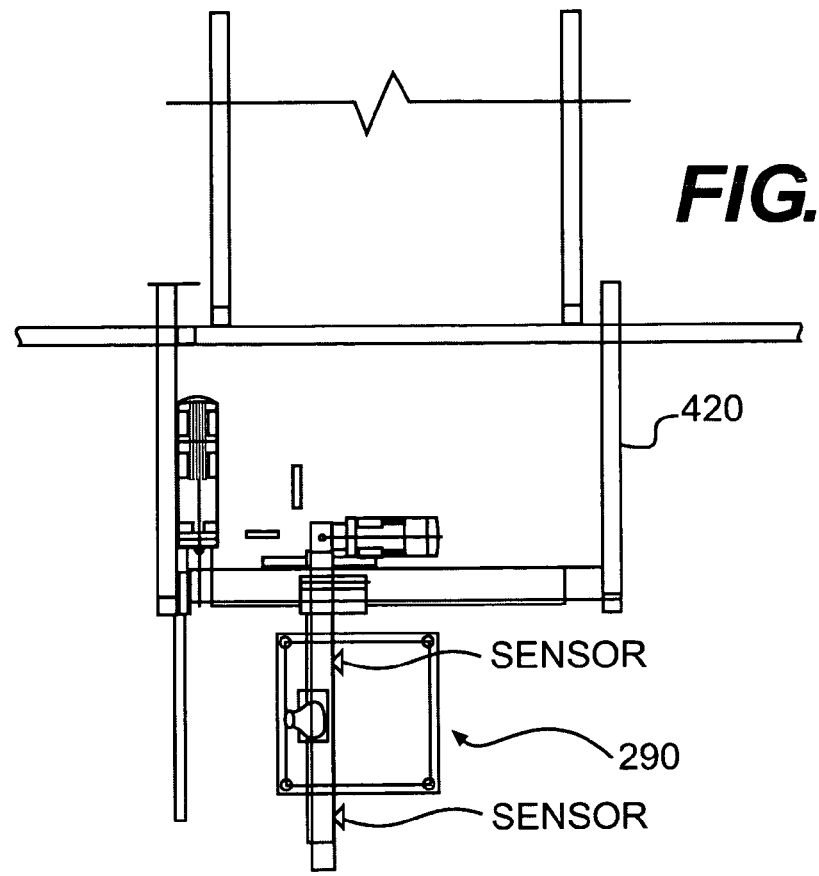
FIG. 9 shows an affixing unit consistent with the present invention.
Figure 9B:
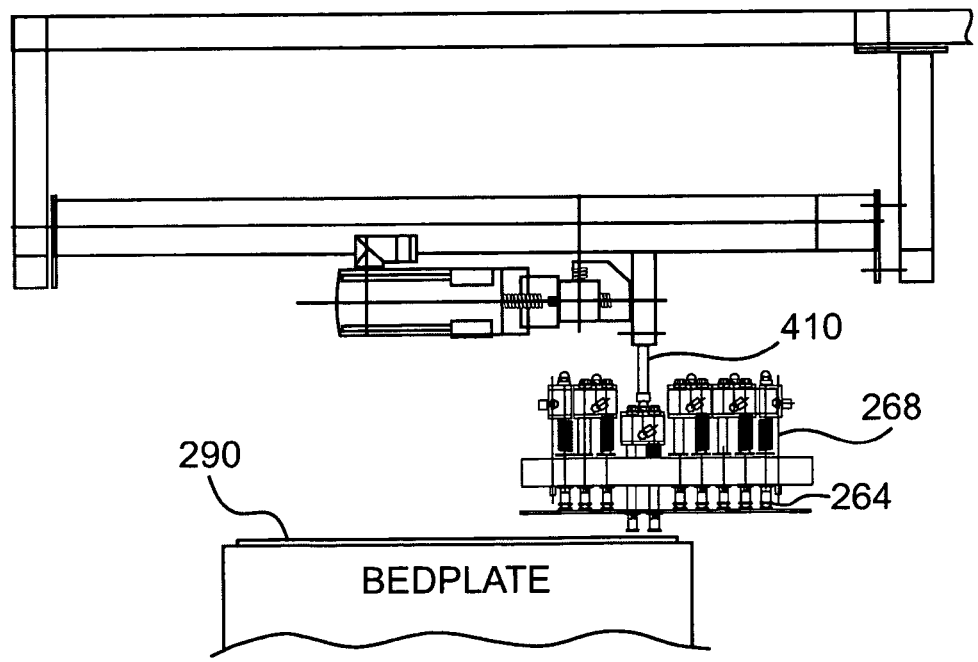

Turning to FIG. 9, an affixing member 410 is mounted on a second X-Y transport mechanism 420, which moves affixing member 410 to a precise location above pickup unit 250, as determined by operator-entered commands supplied to control unit 800. Affixing member 410 may be, for example, a pneumatically-operated plunger.

Control unit 800 actuates affixing member 410, causing it to descends into contact with a nub 266 of precisely selected suction unit 256. Spring 268 of the selected suction unit 256 compresses and the respective suction cup 264 then descends, causing the respective stamp held by suction cup 264 to move into contact with a substrate 290, resting on bed plate 295. While the stamp is in contact with substrate 290, control unit 800 actuates the valve 254 corresponding to the selected suction unit 256, removing vacuum from the suction cup and releasing the stamp. The pressure adhesive of the stamp causes the stamp to be affixed to substrate 290. Control unit 800 then actuates affixing member 410, causing it to lift, allowing spring 268 to return suction cups 264 into position in proximity to suction plate 252.

Although the above operation was described with one suction cup per suction unit, in certain applications it may be desirable to provide a plurality of, for example, four, suction cups per suction unit. Similarly, in certain applications it may be desirable to provide affixing unit with a broad strike surface, such that it contacts more than one suction unit.

The stamp affixing operation is programmable through an operator interface to hold substrate 290 in position as pickup unit 250 and affixing member are translated to precise desired locations to sequentially affix additional stamps on other locations of substrate 290. This operation is particularly useful for instances when it is desired to affix multiple stamps from a given design or series of stamps. Alternately, programming commands may instruct the transport mechanism 120 to advance following each affixing step, precisely positioning the next substrate beneath the positioning member so that a single stamp may be affixed to each target material, each in the same position on the subsequent substrates. When the affixing procedure is completed on a substrate, it is transported away from affixing station 300 toward output unit 700, where it may be dropped onto a conveyor belt running perpendicular to transport mechanism 120. From this point, an operator may collect the finished product.

Figure 10A:
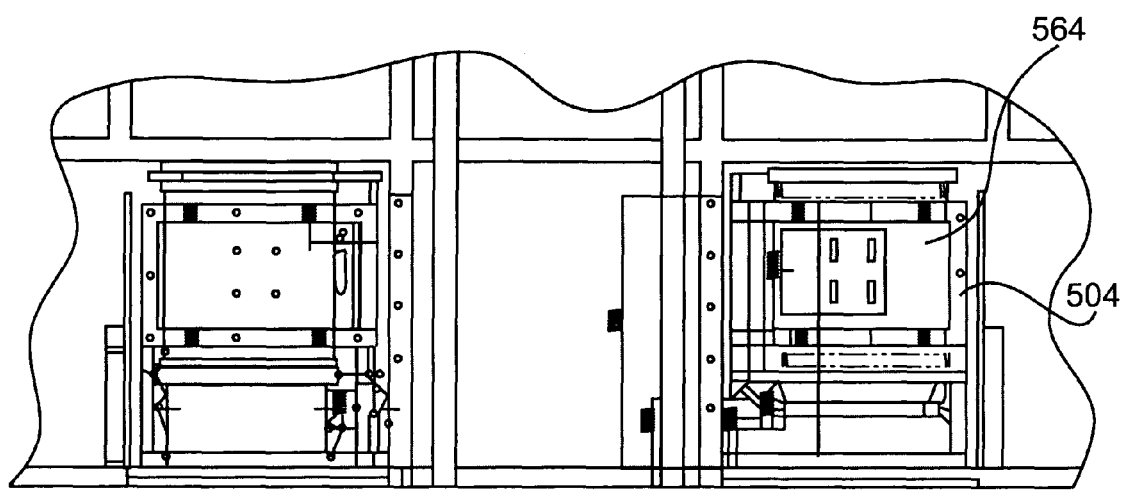
FIG. 10 shows one of a pair of salvage units consistent with the present invention.
Figure 10B:
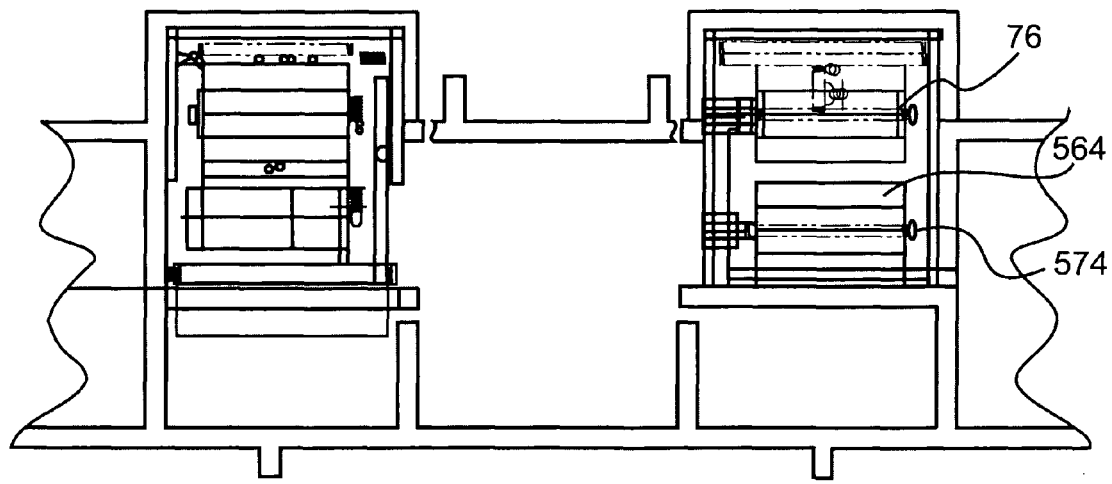

FIG. 10 shows salvage unit 400, which is used to collect unused stamps and sheet margins for operator disposal. After depositing the required number of stamps from the sheet onto target substrates at affixing station 300, pickup unit 250 moves back toward sheet unit 200 to the salvage unit 400. There, control unit 800 causes a pressure plate, activated by four (4) pneumatic cylinders, to descend onto suction plate 252 depressing all spring-loaded vacuum cups 264 onto a continuous roll of salvage paper that passes over a stamp deposit plate of salvage unit 400.

In another embodiment, stamps unaffixed to target substrates are affixed at salvage unit 400 to a second backing material. Stamps on this second backing material may be collected for accounting. In still another embodiment, sheets, rather than rolls can be used to mount unused stamps upon.

In some embodiments, all stamps from a sheet may not be desired to be affixed onto a target substrate. This would often occur when affixing specific designs from a multiple design sheet or a specific configuration, such as a plate number block of four stamps. In such an embodiment, prior to pickup unit 250 returning to sheet unit 200 to pick up another sheet of stamps, it first drops the entire array of suction cups 264 onto a platform 504 to release any unused stamps. The platform 504 is covered with backing paper 564 for later reuse, or other paper, on a roller mechanism 574, 576. Any remaining stamps are affixed to this paper on platform 504 which is automatically advanced by a take up roller. At the end of a run or affixing period, the roll of paper 564 may be retrieved and any reaffixed stamps counted. Since stamps have inherent monetary value, this controlled method of disposing of unused stamps allow appropriate accounting and inventory in the instance of non-backing paper and reuse in the case of backing paper.

Figure 11:
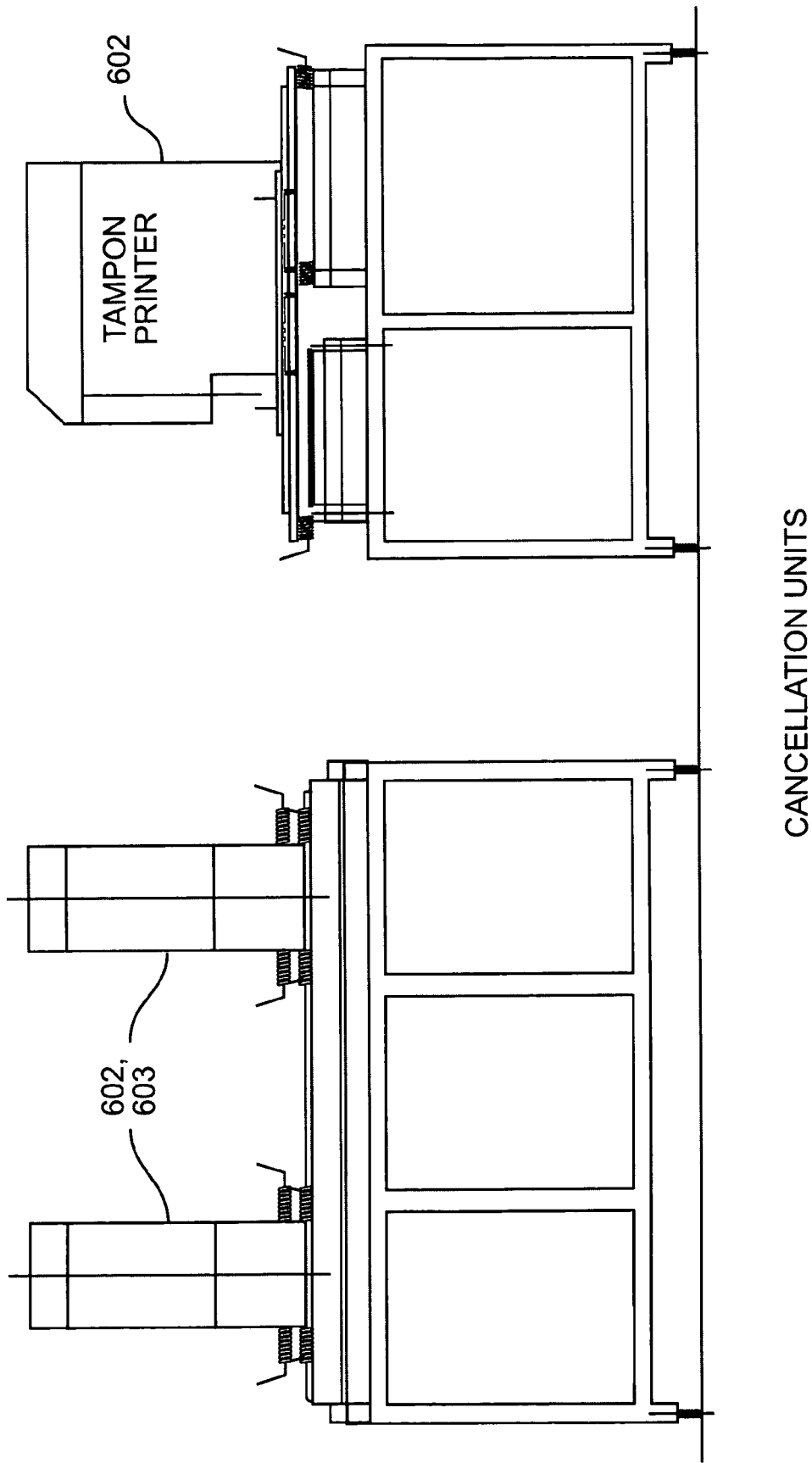
FIG. 11 shows a cancellation unit consistent with the present invention.

FIG. 11 shows cancellation units 600 which, in one embodiment, may comprise one or more Tampon printers 602. A printing pad comprises an engraved image of, for example, a postmark. Alternatively, multiple pads may be combined to form an intricate postmark when printed in combination. In other embodiments a one or more digital printers 603 in cancellation unit 400, may print a postmark on the target substrate and the affixed stamps. A series of postmarks may be imprinted or alternatively a series of printing stages may form a complex postmark. The digital printers can form black and white or multi-colored postmarks. Personalized postmarks are possible in accordance with another embodiment of the present invention.

Figure 12:
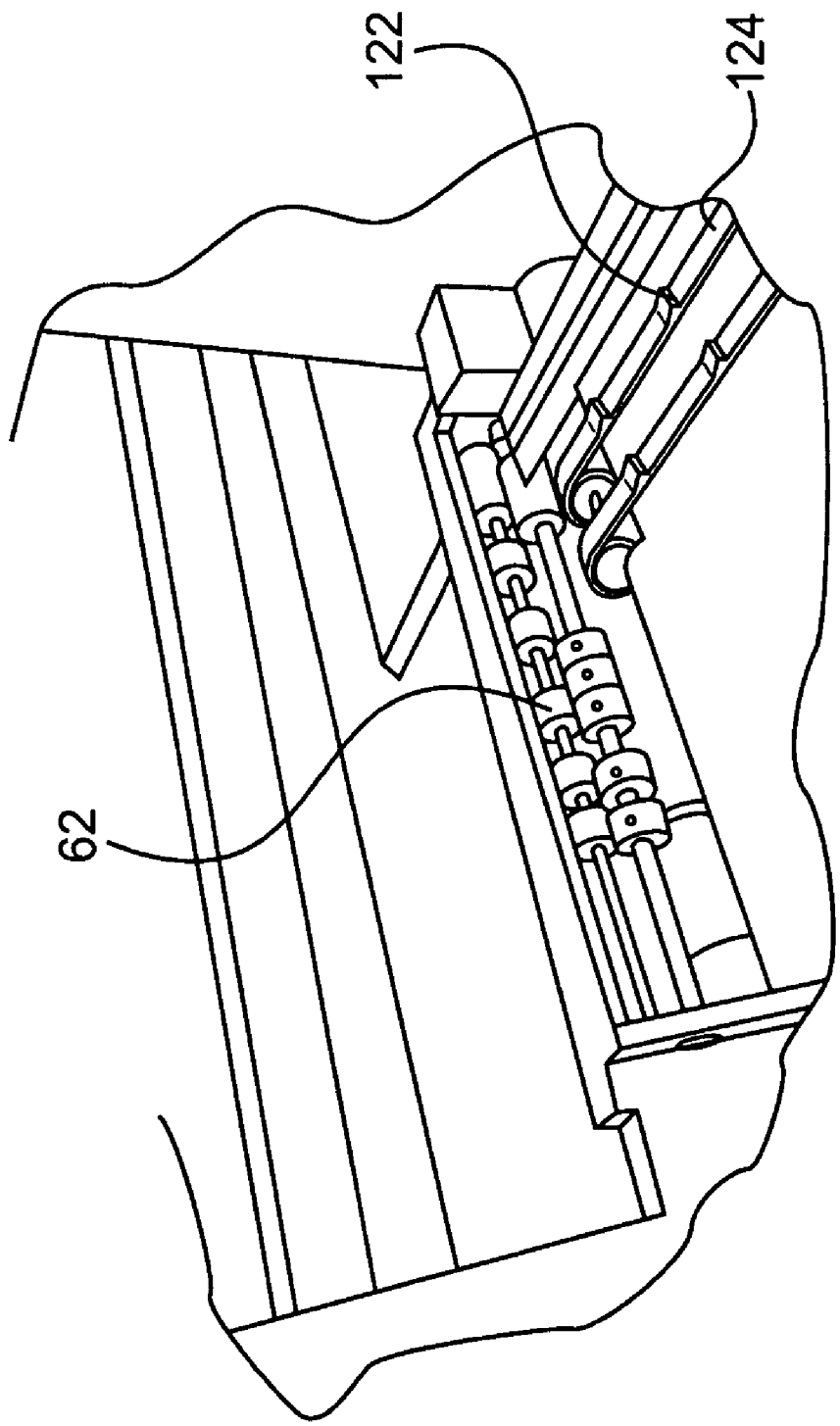
FIG. 12 shows an output unit 700 consistent with the present invention.

FIG. 12 shows an output unit 600 consistent with the present invention. An outfeed unit can, in one embodiment, be programmed in control unit 800 to stack the affixed substrates. Both the number of substrates in a stack and an offset spacing between individual substrates within a stack can be specified, for example, 25 and 0.5 in, respectively. Discharge rollers of output unit 700 may be positioned at the end of system 10 and eject the finished product unto a discharge conveyer. The discharge rollers may run at a faster speed than transport mechanism 120, which allows the product to be drawn away from the pushers on the indexing belt of transport mechanism 120.

Figure 13A:
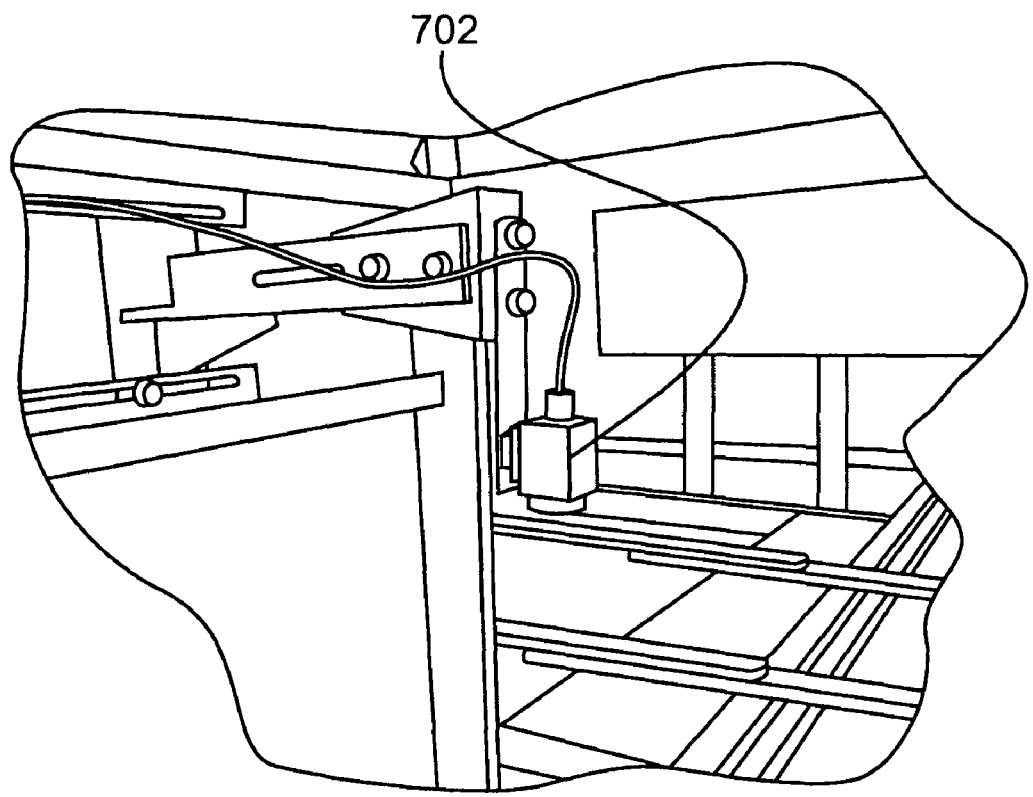
FIG. 13 shows an inspection system 800 consistent with the present invention.
Figure 13B:
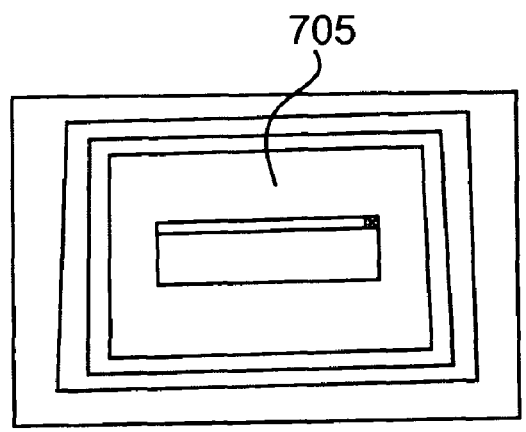

FIG. 13 shows an inspection unit 700, which may optionally be used with system 10, consistent with the present invention. FIG. 1 shows the physical location of inspection unit 700 in relation to other system components. Inspection unit 700 automatically inspects affixed (and, if applicable, postmarked) substrates for compliance with quality or inspection standards. These standards are maybe programmed into control unit 800 and the user can select the parameters to evaluate and the tolerances for each parameter. Parameters which can be inspected include: presence of a stamp, position of any or all stamps within 0.02 in. of the desired placement with respect to the substrate and adjacent stamps, and the presence and positioning of a postmark. Alternatively, the inspection parameters may look at the presence and position of a block or group of stamps with or without a postmark as a whole. A digital camera 702 (FIG. 13) mounted within the inspection station accommodates accurate evaluation of various sized target substrates and various stamp configurations. The sensitivity of the inspection is adjustable. For example, the programming user can adjust sensitivity by selection or input of acceptable tolerances. The depth of field or field of view of the camera can be varied by, among other means, changing the camera position relative to the substrate via adjustable-camera-mounting, or adjusting the camera aperture. The inspection station can even be programmed to reject the stamp itself, for example, if it is defective or torn. Access to inspection program parameters may be provided to the user in inspection unit 700 via a touch screen 705 (FIG. 13). Inspection unit 700 may include a counter to track the results, such as the number of rejections identified, from the inspection process.

Figure 14:
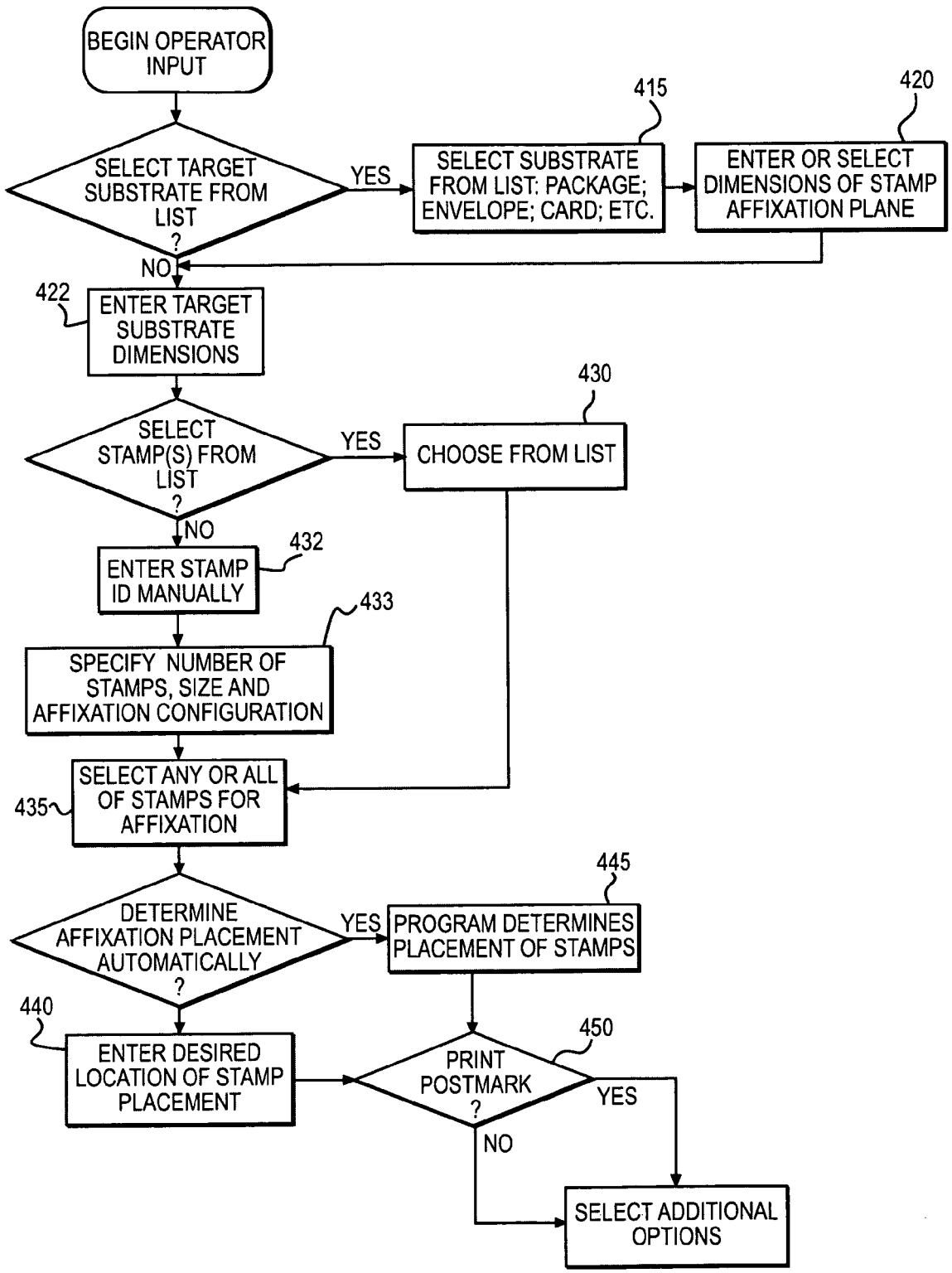
FIG. 14 shows a flow diagram of the operator interface protocol for the system of removing pressure adhesive stamps and affixing the stamps to a target substrate performed by a processor when executing program instructions stored on a computer-readable medium.

Control unit 800 may be a standard programmable industrial or personal computer. Control unit 800 may include a processor, a memory unit and a mass storage unit. As shown in FIG. 2, an operator interface screen 900 coupled to control unit 800 may provide the user with numerous options to program control unit 800. The programmable instructions, which when executed by the processor, may perform a method which includes removing pressure adhesive stamps, and affixing the stamps to a target substrate, selecting a target substrate 410, as shown for example in FIG. 14. The target substrate can be selected from a few or a multitude of substrate options to include a sheet of paper, an envelope, a card, or a package 415. The operator can enter numerically 422 or choose by displayed options the dimensions of the target substrate in a stamp affixation plane 420.

The operator can also select a sheet of stamps from a collection of sheets or may specify the number of stamps, their size, and configuration 432 on the sheet 430. Next, the operator can select any of or all of the stamps for affixing to the target substrate 435.

The operator can indicate the desired placement location of each selected stamp 440. In another embodiment, the placement location is determined by characteristics of the target substrate and the selected stamp or group of stamps 445.

Other programmable options include, selecting a desired postmark application 450 and inputting the height of the target substrate, normal to the affixation plane 455.

In yet another embodiment, an outfeed unit 600 (FIG. 12) and a rejection unit 95 (FIG. 1) facilitate moving affixed substrates out of an automated system. These units are housed downstream of the inspection unit 90, as shown in FIG. 1. The outfeed unit may comprise rollers and a convery and can, in one embodiment, be programmed to stack the affixed substrates. Both the number of substrates in a stack and an offset spacing between individual substrates within a stack can be specified, for example, 25 and 0.5 in, respectively.

The rejection unit 95, ejects substrates, which fail to meet inspection standards, out of the system into a collection apparatus before the substrate would enter the outfeed unit.

In another embodiment, system 10, as shown in FIG. 1, counts the number of target substrates loaded into the feeder, the number of acceptable affixed substrates that have been outfed and the number of substrates which have been rejected and ejected from system 10.

In another embodiment of system 10, the substrate is tracked as it proceeds through the system, for example in the feeder 15, the affixing unit 81, in a first cancellation unit 80, or in the inspection station 90 (FIG. 1).

MOVE to END After affixing the desired stamps, the target substrate is transported through a postmark station in the cancellation units 80, where cancellation occurs if desired and programmed. Following the cancellation unit, substrates enter the inspection and rejection units, 290 and 295, respectively.

Embodiments of the stamp affixing system, apparatus, and method consistent with the invention may perform the task of backing removal and stamp affixing on the target material at a rate of 2400 stamps per hour, a significant improvement over the manual rate.

Peeling Operation

FIG. 8 shows grippers 284, 285 and peel plate 270 according to an embodiment of the apparatus operating in peel areas 60 and 65 (FIG. 1). In this embodiment, suction units 264 not only translate horizontally with respect to peel plate 270 on which the sheet rests, but also slightly in a vertical direction, as shown in FIG. 8. This vertical movement is produced by a ramp portion 259 of pickup plate 258.

As suction plate 252 is translated horizontally to the right with respect to the stationary pickup plate 258, by transport mechanism 280, nubs 266 follow the upwardly curving surface of ramp portion 259, at the edge 271 of peel plate 270. The effect is to separate the column of stamps held by suction units 264 in contact with ramp portion 259 from the remainder of columns of stamps on the sheet. In another embodiment, a pivot mechanism 287 causes gripper 285 to move vertically downward with respect to peel plate 270 before translation of the stamps or the backing, causing a crease in the backing.

Turning to FIGS. 15A-D, an embodiment of the peeling process is shown in still greater detail. The stamps of the sheet are removed from backing 289 while the suction cups 264 hold the stamps. Backing 289 is gripped by grippers 284 and 285 on opposite sides of the sheet, on the border or selvage of the sheet. A slight force is applied to gripper 284 to pull it away from gripper 285 to put the sheet in tension. (Note that movement of the sheet is to the left in FIGS. 15A, 15B, 15C, and 15D, the opposite direction from FIG. 8) Gripper 284, suction units 264, and gripper 285 move at the same speed such that the stamps (held by suction cups 264) and backing 289 of the sheet move in parallel across peel plate 270. As shown in FIG. 8, grippers 284 and 285 are driven by separate server motors. Perforations in the stamps of the sheet, when present, run parallel to the direction of translation of the stamps. FIG. 15C shows the backing 289 completed separated from the stamps 32 and each stamp secured to a suction cup 264.

FIG. 15D shows the backing separated from the stamps and collected in backing dump sites, e.g. 70 and 75 in FIG. 1. The stamps and backing are separated at the edge 47 of the peel plate 270 (FIGS. 8 and 15C).

A sensor detects the position of the affixing head before release of suction on the suction head or heads.

In still another embodiment, the front gripper 284 which is mounted on a vertical slide, is pivoted 30° over a "knife" edge 47 of peel plate 270 (FIG. 8), by a small pneumatic cylinder; this has the effect of separating the backing sheet from the stamps, which are still held on the vacuum cups of the pickup unit. Alternatively, the front gripper 284 is moved vertically down slightly, e.g. by 1 mm, putting tension on the stamp sheet and assisting in removing the backing sheet from the stamps.

The front gripper, rear gripper, and pickup unit now move together to remove the complete backing sheet from the stamps. On reaching a position where the last stamps have been removed, the rear gripper jaws are opened and the front gripper jaws carry the backing sheet down to the 'backing sheet dump' drawer, were it is released.

While FIGS. 15A-D show a one-by-three array of suction units, alternate embodiments include, but are not limited to, five by 12 arrays. Individual suction cups 264 can hold an individual stamp or more than one suction cup 264 can hold a single larger stamp.

Other embodiments consistent the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An apparatus for affixing stamps to a target substrate, comprising:
   a sheet unit that supplies sheets having a plurality of pressure-sensitive stamps adhered to a backing member;
   a feeder unit that supplies a substrate having a planar surface;
   a pickup unit including:
      a pickup plate, and
      a suction plate with a plurality of suction units attached to the suction plate, the plurality of suction units having suction cups that utilize vacuum to pick up the sheets having the plurality of pressure-sensitive stamps, wherein the suction cups are arranged to contact the stamps, the pickup plate parallel to the suction plate and lowered to come into contact with a suction unit of the suction plate,
   a removal unit that removes the backing member while the stamps of the sheet remain held by the pickup unit;
   a first transport mechanism that utilizes the pickup unit to pick up and transport stamps from the sheet unit to an affixing station in a horizontal plane;
   an affixing station, the affixing station comprising an affixing member that operates to affix stamps to the substrate by depressing single suction units in the pickup unit;
   a second transport mechanism that transports the substrate from the feeder unit to the affixing station; and
   a control unit that:
      actuates the pickup unit to pick up and hold a sheet from the sheet unit with the suction cups,
      operate the first transport mechanism to position the affixing member and the pickup unit in desired locations in a horizontal plane with respect to the substrate,
      actuate the affixing member to affix the stamps held by the pickup unit to the planar surface of the substrate by depressing single suction units in the pickup unit, and remove vacuum from at least one of the suction units to permit the affixed first size stamps to remain on the substrate.

2. The apparatus of claim 1, wherein the removal unit comprises:
a removal plate; and
a gripper to grip the backing, and the control unit further operates the gripper to pull the backing against the removal plate while the first transport mechanism moves the pickup unit from the stamp unit toward the affixing station.

3. The apparatus of claim 2, wherein the removal unit includes a pivot mechanism that initiates backing separation.

4. The apparatus of claim 3, wherein the stamps are arranged in columns on the sheet, and the removal unit includes a ramp member that causes separation of adjacent columns of stamps while the gripper removes the backing.

5. The apparatus of claim 1, wherein the suction plate movably supports the suction units.

6. The apparatus of claim 1, wherein the pickup unit includes a plurality of vacuum valves connected to the suction units.

7. The apparatus of claim 6, wherein the control unit:
operates the first transport mechanism to position the pickup unit so that the stamps are in a desired position relative to the substrate;
actuates the affixing member to displace suction cups of a selected portion of the suction units away from the first suction plate so as to cause stamps held by the selected portion of the suction units to contact the substrate, thereby affixing at least onestamp to the substrate;
actuates the valves to remove suction from the selected portion of the suction units; and
operates the affixing member to return the suction cups of the selected portion of the suction units to a position in proximity to the first suction plate.

8. The apparatus of claim 1, further comprising a salvage unit that collects portions of the sheets remaining on the pickup unit after a desired portion of the suction units have affixed stamps to the substrate.

9. The apparatus of claim 1, further comprising at least one cancellation unit that places an imprint on the target substrate.

10. The apparatus of claim 1, further comprising an inspection unit that:
compares affixed stamps to predetermined criteria; and
rejects the compared stamps in accordance with the comparison.

11. The apparatus of claim 10, further comprising a counter that tracks the results of the inspection comparisons.

12. The apparatus of claim 1, further comprising an operator interface that receives operator specification of desired locations for affixing stamps to the substrates.

13. The apparatus of claim 1, wherein the feeder unit stores a plurality of substrates.

14. The apparatus of claim 1, wherein the first and second transport mechanisms and the feeder unit are adjustable to process a plurality of substrate sizes.

15. The apparatus of claim 1, further comprising:
a pair of first components of the first transport mechanism;
a pair of removal units that remove the backing member while the stamps of the sheet remain held by one of the pair of pickup units; and
a pair of sheet units that supply sheets having a plurality of pressure-sensitive stamps adhered to a backing member, wherein the control unit implements staggered operation of the pair of pickup units, the pair of first components of the first transport mechanism, the pair of removal units, and the pair of sheet units.

16. The apparatus of claim 1, wherein the second transport mechanism comprises:
an indexed belt; and
a plurality of pusher members mounted on the belt and spaced to receive individual substrates away from the feeder unit , and the control unit moves the belt so as to cause the pusher members to transport substrates in a direction away from the feeder unit.

17. The apparatus of claim 16, wherein the second transport mechanism comprises a plurality of indexed belts movably mounted within the apparatus so as to permit variable separation distances between the belts.

18. An apparatus for affixing stamps to a target substrate, comprising:
a sheet unit that supplies sheets having a plurality of pressure-sensitive stamps adhered to a backing member;
a feeder unit that supplies a substrate having a planar surface;
a pickup unit including:
a pickup plate, and
a suction plate with a plurality of suction units having suction cups that utilize vacuum to pick up the sheets having the plurality of pressure-sensitive stamps, wherein the suction cups are arranged to contact the pressure-sensitive, the pickup plate parallel to the suction plate and lowered to come into contact with a suction unit of the suction plate,
a removal unit that removes the backing member while the stamps of the sheet remain held by the pickup unit;
a first transport mechanism that utilizes the pickup unit to pick up and transport stamps from the sheet unit to an affixing station in a horizontal plane;
an affixing station including an affixing member that operates to affix stamps to the substrate by depressing single suction units in the pickup unit;
a second transport mechanism that transports the substrate from the feeder unit to the affixing station;
a control unit that:
actuates the pickup unit to pick up and hold a sheet from the sheet unit with the suction cups,
operates the first transport mechanism to position the affixing member and the pickup unit in desired locations in a horizontal plane with respect to the substrate,
actuates the affixing member to affix the stamps held by the pickup unit to the planar surface of the substrate by depressing single suction units in the pickup unit, and
removes vacuum from at least one of the suction units to permit the affixed stamps to remain on the substrate;
a salvage unit that collects portions of the sheets remaining on the pickup unit after a desired portion of suction units have affixed first size stamps to the substrate;
at least one cancellation unit that places an imprint on the target substrate; and
an inspection unit that compares affixed first size stamps to predetermined criteria and reject the compared first size stamps in accordance with the comparison; and
an operator interface that receives operator specification of desired locations for affixing first size stamps to the substrates.

19. An apparatus for affixing stamps to a target substrate, comprising:
a sheet unit that supplies sheets having a plurality of pressure-sensitive stamps adhered to a backing member;

a feeder unit that supplies a substrate having a planar surface;

a pickup plate, wherein the pickup plate includes:
- a plurality of suction units mounted in a spring-loaded configuration on a suction plate and having a plurality of suction cups, wherein the pickup plate is parallel to the suction plate and lowered to come into contact with a suction unit coupled to the suction plate,
- a vacuum manifold comprising a component for removable attachment to a vacuum source of the apparatus,
- a plurality of electrically-operated vacuum valves connected to the vacuum manifold,
- a plurality of connection hoses that removably connect the vacuum valves and the suction units,
- an electrical connector having a component for removable connection to a control unit of the apparatus, and
- a plurality of control wires connected between the vacuum valves and the electrical connector;

a removal unit that removes the backing member while the first size stamps of the sheet remain held by the pickup plate;

a first transport mechanism that utilizes the pickup unit to pick up and transport stamps from the sheet unit to an affixing station in a horizontal plane;

an affixing station including an affixing member that operates to affix stamps to the substrate by depressing single suction units in the pickup unit;

a second transport mechanism that transports the substrate from the feeder unit to the affixing station; and a control unit that:
- actuates the pickup unit to pick up and hold a sheet from the sheet unit with the suction cups,
- operates the first transport mechanism to position the affixing member and the pickup plate in desired locations in a horizontal plane with respect to the substrate,
- actuates the affixing member to affix the stamps held by the pickup plate to the planar surface of the substrate by depressing single suction units in the pickup unit, and
- removes vacuum from at least one of the suction units of the plurality of suction units to permit the affixed stamps to remain on the substrate.

* * * * *